US012591695B2

(12) United States Patent
Strandborg et al.

(10) Patent No.: US 12,591,695 B2
(45) Date of Patent: Mar. 31, 2026

(54) METHOD OF IMAGE PROCESSING FOR THREE-DIMENSIONAL RECONSTRUCTION IN AN EXTENDED REALITY ENVIRONMENT AND A HEAD MOUNTED DISPLAY

(71) Applicant: Varjo Technologies Oy, Helsinki (FI)

(72) Inventors: Mikko Strandborg, Hangonkylä (FI); Kai Inha, Helsinki (FI); Mikko Ollila, Tampere (FI)

(73) Assignee: Varjo Technologies Oy, Heklsinki (FI)

( * ) Notice: Subject to any disclaimer, the term of this patent is extended or adjusted under 35 U.S.C. 154(b) by 167 days.

(21) Appl. No.: 18/599,317

(22) Filed: Mar. 8, 2024

(65) Prior Publication Data

US 2025/0284825 A1      Sep. 11, 2025

(51) Int. Cl.
| *G06F 21/60* | (2013.01) |
| *G06F 21/84* | (2013.01) |
| *G06T 19/00* | (2011.01) |

(52) U.S. Cl.
CPC ............ *G06F 21/604* (2013.01); *G06F 21/84* (2013.01); *G06T 19/006* (2013.01)

(58) Field of Classification Search
None
See application file for complete search history.

(56) References Cited

U.S. PATENT DOCUMENTS

| 2017/0289623 | A1* | 10/2017 | Bailey ................ H04N 21/4542 |
| 2018/0190032 | A1* | 7/2018 | Barnett ................... G06Q 50/01 |
| 2019/0210223 | A1* | 7/2019 | Goldberg ................. G06T 17/20 |
| 2021/0390777 | A1* | 12/2021 | Lopez Mendez ......... G06T 7/10 |
| 2022/0255995 | A1* | 8/2022 | Berliner .............. G06F 3/04883 |
| 2022/0374543 | A1* | 11/2022 | Chen ...................... G06T 19/006 |
| 2024/0303946 | A1* | 9/2024 | Gehrmann ............. G06V 20/20 |

* cited by examiner

*Primary Examiner* — David H Chu
(74) *Attorney, Agent, or Firm* — Ziegler IP Law Group, LLC.

(57) ABSTRACT

Disclosed is method of image processing for three-dimensional reconstruction in an extended reality environment. The method includes defining a set of visual-attributes derived from reference images; identifying presence of at least one visual-attribute in a displayable content of target images to be used for the three-dimensional reconstruction; and modifying the displayable content of the target images, by concealing or displaying the identified at least one visual-attribute, for the three-dimensional reconstruction in the extended reality environment.

13 Claims, 5 Drawing Sheets

400

400

400

METHOD OF IMAGE PROCESSING FOR THREE-DIMENSIONAL RECONSTRUCTION IN AN EXTENDED REALITY ENVIRONMENT AND A HEAD MOUNTED DISPLAY

TECHNICAL FIELD

The present disclosure relates to methods of image processing for three-dimensional reconstruction in extended-reality environments. Moreover, the present disclosure relates to head mounted displays of image processing for three-dimensional reconstructions in extended-reality environments.

BACKGROUND

In recent times, there is an ever-increasing demand for image processing and high-quality image generation in different computing applications. Similar demand is seen in an application of immersive extended-reality (XR) environments, which are being employed in various fields such as entertainment, real estate, training, medical imaging operations, simulators, navigation, and the like. Such immersive XR environments are presented to a user of an XR device (such as an XR headset, a pair of XR glasses, or similar). The existing image generation techniques facilitate high-quality and realistic three-dimensional (3D) reconstruction of a real-world environment. Moreover, the existing image generation techniques typically rely on techniques such as 3D point clouds, 3D meshing, machine learning (ML)-based approaches (for example, such as Neural Radiance Fields (NeRFs)), image-based techniques, and the like.

However, the existing image generation techniques for implementing 3D reconstruction are associated with several limitations. Firstly, the existing image generation techniques are inefficient to protect privacy of individuals or to hide a sensitive information (such as a trade information, secret data, charts) or to remove any unwanted person from background. Secondly, the existing image generation techniques perform an overall blurring process for all parts of an image during the 3D reconstruction of that image and not only on the sensitive or confidential information.

Therefore, in light of the foregoing discussion, there exists a need to overcome the aforementioned drawbacks.

SUMMARY

The aim of the present disclosure is to provide a method and a head mounted display to modify displayable content in an extended-reality environment to detect and protect privacy, secrecy and morality of users and users' information. The aim of the present disclosure is achieved by a method of incorporate image processing for three-dimensional reconstruction in an extended-reality environment and a head mounted display thereof as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
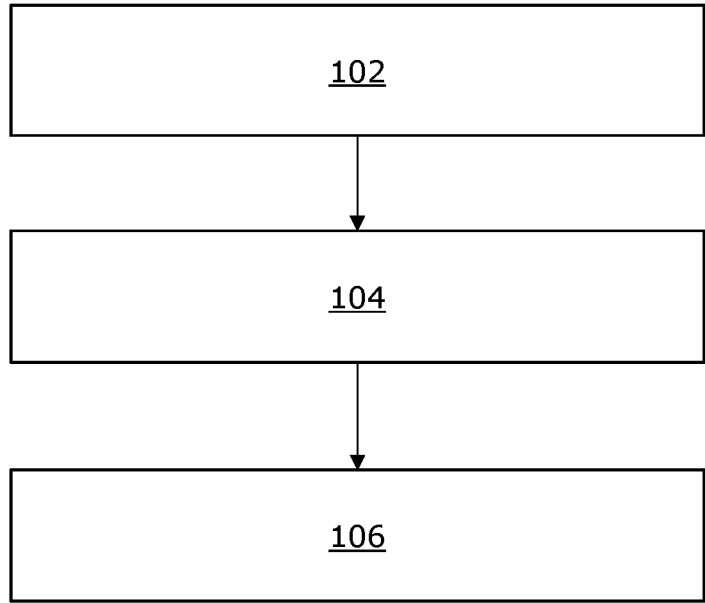
FIG. 1 is an illustration of a flowchart depicting steps of a method of image processing for three-dimensional reconstruction in an extended reality environment, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method of image processing for three-dimensional reconstruction in an extended reality environment, the method comprising:

defining a set of visual-attributes derived from reference images;

identifying presence of at least one visual-attribute in a displayable content of target images to be used for the three-dimensional reconstruction; and modifying the displayable content of the target images, by concealing or displaying the identified at least one visual-attribute, for the three-dimensional reconstruction in the extended reality environment.

The present disclosure provides an aforementioned method that improves efficiency in image processing for three-dimensional reconstruction in an extended-reality environment. Moreover, defining the set of visual-attributes from reference images provides a basis for subsequent analysis of target images and allows to identify the at least one visual-attribute that are crucial to be modified for the three-dimensional reconstruction process. Moreover, identifying the presence of the at least one visual-attribute ensures that the relevant information such as (objects, colours, textures or area of the image) for three-dimensional reconstruction is properly recognized and processed. Furthermore, modifying the displayable content by concealing or displaying, allows for better control over the final three-dimensional reconstructed image. The ability to conceal or display specific visual attributes allows for on-the-fly adjustments to the content based on needs of the three-dimensional reconstruction.

In a second aspect, the present disclosure provides a head mounted display comprising:

a camera for capturing target images,
a processor operatively coupled to the camera, the processor is operable to:
   define a set of visual-attributes derived from reference images;
   identify presence of at least one visual-attribute in a displayable content of the target images to be used for a three-dimensional reconstruction; and
   modify the displayable content of the target images, by concealing or displaying the identified at least one visual-attribute, for the three-dimensional reconstruction in an extended reality environment;
a memory, operatively coupled to the processor, for storing the displayable content; and
a display screen, operatively coupled to the processor, for viewing the displayable content.

The present disclosure provides an aforementioned head mounted display that improves efficiency in image processing for three-dimensional reconstruction in an extended-reality environment. Moreover, the camera and the processor integrated in the head mounted display enable real-time capture and processing of the target images, allowing for seamless interaction with reconstructed three-dimensional content in the extended-reality environment. The head mounted display provides a convenient and hands-free way to interact with and explore the reconstructed three-dimensional content, enhancing the extended-reality experience. Furthermore, the processor is operable to define a set of visual-attributes from the reference images for subsequent analysis of target images and allows to identify the at least one visual-attribute that are crucial for the three-dimensional reconstruction process. Based on the identified at least one visual-attribute, the processor is able to dynamically modify the target images by concealing or displaying the at least one visual-attribute.

Throughout the present disclosure, the term "image processing" refers to analysis and manipulation of the target images for facilitating the three-dimensional reconstruction in the extended reality environment. Throughout the present invention, the term "three-dimensional reconstruction" refers to a process of creating a digital three-dimensional (3-D) model from any set of two-dimensional (2-D) images. Notably, the image processing performed on the targets images enables the 3-D reconstruction using the target images which are 2-D. Typically, the 3-D reconstruction involves capturing information from the target images having different viewpoints at various different angles. The captured information is analysed to identify elements such as edges, textures and depth cues, which is crucial for the 3-D reconstruction. The term "extended reality (XR)" encompasses virtual reality (VR), augmented reality (AR), mixed reality (MR), and the like. The term "extended reality environment" as used herein refers to an environment which encompasses a combination of virtual reality (VR), augmented reality (AR), mixed reality (MR), and the like. Typically, the extended-reality environment merges elements of a physical world captured through sensors or camera, with virtual elements generated by computers. The extended-reality environment creates a unified experience where real and virtual objects coexist and interact. Notably, the 3-D reconstruction in the XR environment makes the method suitable to be implemented in XR applications.

The term "set of visual-attributes" as used herein refers to a collection of specific attributes or characteristics derived from the reference images that are to be modified during the 3-D reconstruction in the XR environment. Typically, the set of visual-attributes may include basic attributes such as colours, edges, textures, shapes and depth cues derived from the reference images in some implementations, and complex attributes such as material properties (such as reflective, metallic and transparent), object type (such as a person, an avatar, computing device) and the like derived from the reference images in other implementations. Notably, the set of visual-attributes are derived to be relevant to the XR environment in which the 3-D reconstruction is to be performed. The term "reference images" as used herein refers to a set of training images that are associated with different scenarios in which the XR environment may be implemented. Subsequently, the set of visual attributes derived from the reference images are associated with the different scenarios in which the XR environment may be implemented. Notably, the set of visual-attributes are derived from the reference images using image recognition algorithms that identify the set of visual-attributes in the reference images. Moreover, deriving the set of visual-attributes comprises selection of specific features or characteristics within the reference images, that are deemed significant for the 3D reconstruction in the extended-reality environment. Subsequently, parameters or criteria for the recognition and measurement of the set of visual-attributes are set, which includes establishing thresholds, defining colour ranges or specifying geometric properties, depending on a nature of the set of visual-attributes.

Optionally, the set of visual-attributes comprises at least one of:
   one or more areas in a displayable content of the reference images,
   one or more objects in the displayable content of the reference images,
   one or more colours in the displayable content of the reference images,
   one or more textures in the displayable content of the reference images.

In this regard, the term "displayable content of the reference images" refers to visual or graphical information present in the reference images. The term "one or more areas" as used herein refers to those one or more spatial areas or regions within the displayable content of the reference image that are to be modified during the 3-D reconstruction in the XR environment. It will be appreciated that the "one or more areas" refers to "one area" in some implementations, and "a plurality of areas" in other implementations. Typically, the one or more areas can be determined on a basis of coordinates, shapes and the like. The term "one or more objects" refers to one or more physical objects or portion of the physical objects present in the displayable content of the reference images that are to be modified during the 3-D reconstruction in the XR environment. It will be appreciated that the "one or more objects" refers to "one object" in some implementations, and "a plurality of objects" in other implementations. The one or more objects may include a living object (for example, a human, a pet, a plant, and the like) or a non-living object (for example, a wall, a window, a toy, a poster, a lamp, a tablet, a chair, a cup and the like). The one or more objects may be specific points or regions to be tracked across the displayable content of the reference images. The term "one or more colours" as used herein refers to one or more specific colour values or ranges within the displayable content of the reference images that are to be modified during the 3-D reconstruction in the XR environment. It will be appreciated that the "one or more colours" refers to "one colour" in some implementations, and "a plurality of colours" in other implementations. Typically, the one or more colours are expressed in form of RGB values. The term "one or more textures" as used herein refers to one or more visual patterns or surfaces within the displayable content of the reference images that are to be modified during the 3-D reconstruction in the XR environment. It will be appreciated that the "one or more textures" refers to "one texture" in some implementations, and "a plurality of textures" in other implementations. Typically, the one or more textures encompasses details related to patterns, surface qualities or variations in a visual appearance of the displayable content of the reference images. The one or more textures can be identified by utilizing pre-existing libraries, procedural generation algorithms or user-created inputs. Moreover, the one or more textures may include the patterns representing different materials such as metal, fabric, wood, plastic and the like. Moreover, techniques like texture analysis, image segmentation and reference databases can be used to identify and differentiate the one or more textures within the displayable content of reference images. A technical effect is that the set of visual-attributes comprises a wide range of attributes and features that can be modified during the 3-D reconstruction in the extended reality environment.

Notably, defining the set of visual-attributes derived from the reference images implies to associating the set of visual-attributes with different subsets which enables to determine what is a suitable modification for the set of visual-attributes. Optionally, defining the set of visual-attributes comprises at least one of:

defining the set of visual-attributes as conceal-attributes associated with an undesirable visual content, and defining the set of visual-attributes as display-attributes associated with a desirable visual content.

In this regard, the term "conceal-attributes" as used herein refers to a specific subset of the set of visual-attributes that are to be modified by hiding or concealing during the 3-D reconstruction in the extended-reality environment. The term "undesirable visual content" as used herein refers to that visual content that is considered as unwanted, inappropriate or detrimental in a specific context related to the XR environment. Typically, the undesirable visual content depends on rules, regulations, and standards set for the XR environment for which the 3-D reconstruction is implemented. Subsequently, the set of visual-attributes that contain the undesirable visual content is defined as the conceal-attributes associated with the undesirable visual attributes. The term "display-attributes" as used herein refers to another specific subset of the set of visual-attributes that are to be modified by highlighting or displaying during the 3-D reconstruction process in the extended reality environment. Typically, the set of visual-attributes are defined as the display-attributes to ensure a prominence of the set of visual-attributes during the 3-D reconstruction. The term "desirable visual content" as used herein refers to that visual content that is considered significant, favourable or beneficial in a specific context related to the XR environment. In some implementations, some of the set of visual-attributes are defined as the conceal-attributes and remaining of the set of visual-attributes are defined as the display-attributes. The defining of the set of visual-attributes as the conceal-attributes relies on machine learning algorithms trained to identify the visually undesirable content that is sensitive to privacy, in the set of visual-attributes. Similarly, the defining of the set of visual-attributes as the display-attributes relies on the machine learning algorithms trained to identify the visually desirable content that is appealing and contextually relevant to the XR environment, in the set of visual-attributes. Notably, the display-attributes are modified to be visually enhanced, whereas the conceal-attributes are modified to be visually concealed to achieve a well-balanced and accurate 3-D reconstruction in the extended reality environment. A technical effect is that set of visual attributes are effectively defined for ensuring that the set of visual-attributes gets suitably modified during the 3-D reconstruction if required.

Optionally, the undesirable visual content is associated with one of a private information, a secret information or an immoral information, and the desirable visual content is associated with one of a public information, a known information or a moral information. The term "private information" as used herein refers to an information related to a person or an entity that is not intended for public disclosure or widespread knowledge (such as, an individual exercising in a room, who does not want to expose their face and identity). Typically, the access to the private information is restricted to specific individuals or entities. Moreover, the private information may include an individual's identity, contact information, financial records, medical history or the like information that, if exposed, could lead to an invasion of privacy or potential harm. Notably, the undesirable visual content being associated with the private information is determined through the use of facial recognition technology or biometric identifiers, and employing data aggregation on the set of visual-attributes. The term "secret information" as used herein refers to that information that is to be kept confidential or hidden from the public knowledge. Typically, the secret information may include military plans, confidential business strategies, classified government intelligence, proprietary designs or internal documents that may be classified as secret. Moreover, the secret information, if disclosed, could compromise security, jeopardize strategic interests or lead to adverse consequences. The term "immoral information" as used herein refers to the information that goes against social principles of morality, ethics and behavioural norms. Typically, the immoral information is characterized by actions and representations that are considered morally wrong or socially unacceptable. The immoral information may include depictions of violence, explicit adult content, hate speech and the like. The undesirable content being associated with the one of the private information, the secret information or the immoral information implies a connection or a relationship of the undesirable visual content with the one of the private information, the secret information or the immoral information. Typically, the undesirable visual content may be tagged, labelled or associated with a metadata that explicitly determines the association with the one of the private information, the secret information or the immoral information.

The term "public information" as used herein refers to that information or content that is openly available and accessible to people without any restrictions or need for special authorization. Typically, the public information may include the information available on public websites, government databases or available through public records (such as statistical information, published research finding or news article). The term "known information" as used herein refers to the information that is already revealed, recognized or understood by the general public. Typically, the known information is readily available and can be accessed or verified through common knowledge sources, public records or through historical data. The term "moral information" as used herein refers to the information that is aligned with ethical principles, values or standards of right and wrong behaviour. Typically, the moral information promotes concepts of morality, ethics and good conduct and often encouraging positive social behaviours and positive attitudes. Moreover, the moral information can be contextually dependent on societies, cultures or individuals based on different moral beliefs. Beneficially, the moral information can serve the purpose of educating viewers, promoting social cohesion or inspiring a positive change in the XR environment. A technical effect is that the one of the private information, the secret information or the immoral information being associated with the undesirable visual content ensures that the one of the private information, the secret information or the immoral information gets concealed during the 3-D reconstruction in the XR environment. Another technical effect is that the one of the public information, the known information or the moral information being associated with the display-attributes ensures that the one of the public information, the known information or the moral information gets visually enhanced during the 3-D reconstruction in the XR environment.

Optionally, the set of visual-attributes are associated with at least one of:

static or moving object, reflection of the static or moving object.

In this regard, the term "static object" as used herein refers to an entity, an item or an element derived from the reference images that remains stationary or unchanged over a period of time in the displayable content of the reference images. Typically, the static object maintains a fixed location, shape or appearance. The static objects are not subject to motion or dynamic transformations. In this regard, the static object may include a computer tablet lying on a table in the reference images, any information written on a board and the like. The term "moving object" as used herein refers to that entity or element derived from the reference images that undergoes some movement or displacement over a period of time. Typically, the moving object exhibits moving behaviour and attributes such as location, speed and direction of the moving object can change. Moreover, the moving object may include a person walking in a room, flowing water, moving elements in a motion picture. Notably, associating the set of visual-attributes with the static or the moving object allows for systematic and efficient 3-D reconstruction. The static object benefit from a high-fidelity in the 3-D reconstruction, while the moving object requires motion tracking and dynamic updates in the 3-D reconstruction. The term "reflection" as used herein refers to a mirrored or duplicate representation of the static or the moving object's visual characteristics. Typically, the reflection of the static or the moving object is seen in reflective surfaces in the displayable content of the reference images (such as a display screen showing the reflection of the written text on the board or a moving object such as moving girl's reflection in the glass of the building). Moreover, the reflection of the static or the moving object is detected through techniques like texture analysis or ray tracing. Notably, the reflection of the static or the moving object being associated with the set of visual-attributes enables to modify the reflection of the static or the moving object during the 3-D reconstruction. A technical effect is that the static or the moving object, and/or the reflection of the static or the moving object is able to be modified during the 3-D reconstruction in the XR environment.

The term "target images" as used herein refers to the images captured or selected in real-time that are representative of the extended-reality environment. Typically, the target images serve as an input data for the 3D reconstruction process in the extended-reality environment. The term "displayable content" as used herein refers to visual or graphical information present in the target images that is to be 3D reconstruction in the extended-reality environment. Typically, the displayable content encompasses entire image or the specific regions within the target images or foreground elements that are distinct from a background of the target images. Notably, identifying the presence of the at least one visual-attribute implies checking for presence of one or more visual-attributes from amongst the set of visual-attributes, in the displayable content of the target images. It will be appreciated that the "at least one visual-attribute" refers to "one visual-attribute" in some implementations and "a plurality of visual-attributes" in other implementations. Typically, the step of identifying the presence of the at least one visual-attribute comprises locating relevant features in the displayable content of the target images that matches the set of visual-attributes. Moreover, computer vision algorithms, pattern recognition or feature matching techniques are used to analyse the target images and identify the presence of the at least one visual-attribute in the displayable content of the target images. Beneficially, identifying the presence of the at least one visual-attribute facilitates to understand what modifications are to be done to the displayable content of the target images and subsequently, adapt the 3-D reconstruction.

The term "modifying" as used herein refers to the process of altering or changing certain aspects of the displayable content in the target images. Typically, modifying the displayable content of the target images is achieved by modifying the at least one visual-attribute either by concealing the at least one visual-attribute or displaying the at least one visual-attribute.

Optionally, modifying the displayable content comprises:

concealing the identified at least one visual-attribute, when the identified at least one visual-attribute relates to the conceal-attributes and number of the conceal-attributes are less than the display-attributes in the displayable content of the images, and displaying the identified at least one visual-attribute, when the identified at least one visual-attribute relates to the display-attributes and number of the display-attributes are less than the conceal-attributes in the displayable content of the images.

In this regard, the term "concealing" as used herein refers to an act of hiding or obscuring the identified at least one visual-attribute within the target image. Typically, the process of concealing can be done for the reasons such as, to protect the privacy, confidential details, to hide the factual or the immoral information within the extended-reality environment. Moreover, the concealing involves hiding the identified at least one visual-attribute from the user's sight. The identified at least one visual-attribute is concealed, if the identified at least one visual-attribute belongs to the conceal-attributes and there are fewer number of the conceal-attributes than the display-attributes in the displayable content of the images. The identified at least one visual-attribute is concealed, using the technique of pixilation, inpainting, masking and the like. The concealing aims to hide the undesirable visual content present in the conceal-attributes when the conceal-attributes are less than the display-attributes in the displayable content of the images. The term "displaying" as used herein refers to an action of presenting or making the identified at least one visual-attribute visible within the target images. Notably, if the identified at least one visual-attribute belongs to the display-attributes and there are fewer display-attributes than the conceal-attributes in the displayable content of the images, then the identified at least one visual-attribute is displayed. Notably, the at least one visual-attribute is displayed using the techniques such as colour enhancement, sharpening, illumination adjustments, and the like. Moreover, the decision to conceal or display is made dynamically, considering the number of the conceal-attributes and the display-attributes in the displayable content of the images. A technical effect is that the displayable content of the target images is effectively modified based on suitable and accurate concealing displaying.

Optionally, concealing the identified at least one visual-attribute comprises one of:

alpha-blending the undesirable visual content associated with the at least one visual-attribute, blurring the undesirable visual content associated with the at least one visual-attribute, masking the undesirable visual content associated with the at least one visual-attribute, or overlaying the undesirable visual content, with artificially generated content, associated with the at least one visual-attribute.

In this regard, the term "alpha-blending" as used herein refers to a blending process where the undesirable visual content in the form of the at least one visual-attribute is blended with a surrounding content based on a transparency (alpha) value. For example, a person's body is alpha-blended with a road behind him, to hide the identity of the person. Typically, the alpha-blending allows some visibility of the undesirable content while reducing a prominence of the undesirable visual content. Beneficially, the alpha-blending offers smooth transitions and avoids abrupt disappearance of the undesirable visual content. Moreover, the alpha-blending process identify the undesirable visual content based on the identified at least one visual-attribute and a suitable background image is selected that matches the undesirable visual content. Subsequently, the alpha channel of the undesirable visual content is adjusted to make it progressively transparent towards edges and blend the transparent edges with the suitable background. The term "blurring" as used herein refers to the process where the undesirable visual content is intentionally blurred using the image processing techniques. Typically, the blurring makes the undesirable content less recognizable and serves to hide specific details. For example, a picture showing violent content and bleeding body parts, is blurred before in the XR environment. Moreover, the blurring is performed by applying a blurring filter (such as Gaussian blur to the identified at least one visual attribute) after identifying the undesirable content based on the at least one visual-attribute. The blurring filter smooths out sharp edges and details, creating a hazy or indistinct appearance. Beneficially, the blurring process is effective for obscuring sensitive details and useful for concealing faces, texts and the like.

The term "masking" as used herein refers to a process of creating a mask and apply the mask to the undesirable visual content associated with the at least one visual-attribute. Typically, the mask selectively hides the undesirable visual content in a rest of the target image. Moreover, masking the undesirable visual content includes creating a binary image where the undesirable content is black (opaque) and the rest of the target image is white (transparent). Subsequently, the mask is applied to the target image by multiplying pixel values. Black pixels in the mask make corresponding pixels in the target image transparent and effectively remove them. The term "overlaying" as used herein refers to the process where an artificially generated content is overlaid onto the undesirable visual content associated with the at least one visual-attribute. Typically, the overlaying process replaces or covers the undesirable visual content with the artificially generated content. Moreover, to perform the overlaying, a surrounding scene of the undesirable visual content in the extended reality environment is analyzed to understand visual characteristics (such as textures, colours and the like). Thereafter, image generation techniques (such as Generative Adversarial Networks) are used to create the artificially generated content that blends seamlessly with the surrounding scene and overlay the artificially generated content on top of the undesirable visual content, effectively concealing the undesirable visual content. A technical effect is that a controlled and visually appealing modification of the identified at least one visual-attribute is achieved. Beneficially, techniques such as the alpha-blending, blurring, masking, and overlaying allows for selective concealment of the identified at least one visual-attribute, offering a more customized and privacy-aware user experience in the extended-reality environment. Additionally, these concealing techniques contribute to creating a seamless blend between the concealed and displayed elements, enhancing the overall quality of the visual presentation.

Optionally, the method further comprises controlling a level of concealing the conceal-attributes while modifying the displayable content based on a class of user associated with viewing of the modified displayable content in the extended reality environment, wherein the class of users comprises a first class of users authorized to view the modified displayable content with the conceal-attributes fully concealed and a second class of users authorized to view the modified displayable content with the conceal-attributes partially concealed.

The term "controlling" as used herein refers to an ability to manage or adjust the level of concealing associated with the conceal-attributes, during the modification of the displayable content for the 3-D reconstruction in the XR environment. Typically, controlling the level of concealing involves making decisions or implementing rules associated with the conceal-attributes based on certain criteria such as the class of the user associated with viewing of the modified displayable content. The term "user associated with viewing of the modified displayable content" refers to the user to which the modified displayable content is to be displayed. The term "first class of users" as used herein refers to a specific group or category of users who are authorized to view the modified displayable content with the conceal-attributes fully concealed. Typically, the first class of users (such as camera crew, external employees and the like) have access to the modified displayable content without any visibility of the conceal-attributes. The term "second class of users" as used herein refers to an another group or category of users who are authorized to view the modified displayable content with the conceal-attributes partially concealed. Typically, the second class of users (such as company employees, internal team members and the like) have a restricted view, with some visibility of the conceal-attributes. Moreover, the users are classified into different classes based on certain criteria, likely related to the users' authorization levels or specific permissions. The level of concealing for the conceal-attributes is dynamically adjusted based on an identified class of the users. A technical effect is that a personalized and controlled content visibility achieved based on adjusting the level of concealing for the conceal-attributes. Beneficially, adjusting the level of concealing for the conceal-attributes enhances user privacy, security, and customization within the extended-reality environment.

Optionally, displaying the identified at least one visual-attribute comprises one of sharpening, edge enhancement or contrast enhancement of the desirable visual content associated with the at least one display-attribute. In this regard, the term "sharpening" as used herein refers to an image processing technique that enhances clarity and visual details of the desirable visual content, by making edges and fine details of the desirable visual content more pronounced. Typically, the sharpening involves accentuating high-frequency components of the desirable visual content to create a visually sharper image. Moreover, sharpening filters are applied to the desirable visual content to analyse local pixel neighbourhoods of the desirable visual content and differences between local pixel neighbourhoods (edges) are emphasized to create a crisper and more defined appearance. Beneficially, sharpening the desirable visual content improves a visibility of fine details and textures in the desirable visual content, making objects and the features within the desirable visual content stand out more in the 3-D reconstruction in the XR environment. The term "edge enhancement" as used herein refers to the process that emphasizes on edges and transitions between the desirable visual content and neighbouring parts in the target images. The edge enhancement aims to highlight the edges and transitions, making the edges and transitions visually more distinct. Typically, the edge enhancement techniques involve increasing an intensity gradient near the edges and transitions. The edges are then selectively enhanced by increasing the contrast between the edges and neighbouring pixels of the desirable visual content. Beneficially, the edge enhancement is used for object recognition and improving object separation, spatial understanding and an overall scene clarity in the desirable visual content associated with the at least one visual-attribute. The term "contrast enhancement" as used herein refers to the process of adjusting a difference in brightness or colour between the desirable visual content and neighbouring regions of the desirable visual content in the target images. Typically, the edge enhancement can include increasing an overall contrast or selectively enhancing contrast in specific regions in the desirable visual content. Moreover, histogram equalization or the other contrast enhancement techniques are applied to modify the pixel intensity distribution within the desirable visual content. Beneficially, the contrast enhancement is used for drawing attention to important regions or enhancing subtle details that might otherwise be lost in the desirable visual content. A technical effect of the sharpening, the edge enhancement and the contrast enhancement is an improved and more visually striking presentation of the at least one visual-attribute in the 3-D reconstruction in the XR environment.

Optionally, the displayable content of the images is associated with one of:

a live-displayable content of the target images to be processed for the three-dimensional reconstruction, or a recorded-displayable content of the target images processed to form the three-dimensional reconstruction.

The term "live-displayable content" as used herein a visual information of the target images that is captured and processed in real-time to be modified for the 3-D reconstruction in the real-time. The live displayable content is captured from a real-world environment using sensors (such as cameras and LiDAR scanners). Typically, in the context of 3D reconstruction, the live-displayable content can be the visual data captured on the fly from a live environment as it happens. Beneficially, the live-displayable content allows for immediate interaction and responsiveness to changes in the real-world environment. The XR environment subsequently adapts as the live-displayable content becomes available. The term "recorded-displayable content" as used herein refers to the visual information of the target images that is previously recorded and stored. Typically, the recorded-displayable content is processed offline using various algorithms (such as image stitching and depth estimation), having been captured at an earlier instance of time and is subsequently, modified for the 3-D reconstruction. Moreover, the recorded-displayable content is often used for training machine learning models or for scenarios where playback or analysis of a past environment is needed. A technical effect is that the live-displayable content provides immediate and dynamic 3D reconstruction based on current surroundings and the recorded-displayable content offers flexibility for training, analysis or scenarios where the real-time data capture is not feasible.

Optionally, identifying presence of the at least one visual-attribute, when the displayable content is the live-displayable content, comprises:

capturing the live-displayable content of the target images, and rendering sensitive-information cues, over the live-displayable content, associated within the extended reality environment, wherein the sensitive-information cues enable in identifying the presence of the at least one visual-attribute in the live-displayable content.

In this regard, identifying presence of the at least one visual-attribute, when the displayable content is the live-displayable content, comprises capturing the live-displayable content of the target images. The live-displayable content of the target images can be any object, area, colour or texture associated with the extended reality environment. Further, the live-displayable content may be one of the undesirable or desirable visual contents based on whether the conceal-attributes or display-attributes associated therewith, respectively. The live-displayable content of the target images needs to be processed in a real-time for the identification of the conceal-attributes or display-attributes therefrom. Optionally, the identification of the conceal-attributes or display-attributes from the live-displayable content is done with the help of the sensitive-information cues. For example, the identifying presence of the at least one visual-attribute is performed by rendering the sensitive-information cues, over the live-displayable content, associated within the extended reality environment. The sensitive-information cues may be indicators that point towards the presence of potentially undesirable content within an image. The sensitive-information cues enable the identification of at least one visual attribute in live-displayable content. This identification can be achieved by analyzing both contextual information (e.g., camera activity, user type) and the image content itself (e.g., objects, colors). By analyzing these cues, the users can be guided, suggested, or warned in the extended reality environment to act or participate in a way that avoids potentially undesirable content being generated in the final displayable content. For example, a cue might hover above a user if they are about to capture an image from a prohibited viewpoint, prompting them to adjust their angle. A technical effect is that the at least one visual-attribute is effectively identified using the sensitive-information cues.

Optionally, the sensitive-information cues comprise:

activation status of cameras in the extended reality environment, activation camera being real or virtual, users being real person or avatar, authorized cameras for capturing the target images, users sharing a same virtual space, prohibited viewpoints (208) for capturing the target images, and prohibited distances (210) for capturing the target images.

In this regard, the sensitive-information cues comprise activation status of cameras in the extended reality environment, activation camera being real or virtual, users being real person or avatar, authorized cameras for capturing the target images, users sharing same a virtual space, prohibited viewpoints for capturing the target images, and prohibited distances for capturing the target images. The activation status of cameras, i.e., when a camera is actively recording or not, could be indicated as the sensitive-information cues. Based on such sensitive-information cues user can amend the way of participation in the extended reality environment for dynamically modifying generation of the displayable content for the target images. Further, the sensitive-information cues, associated with the activation camera being real or virtual or the user being real person or avatar, may enable in controlling recording ability of cameras in the extended reality environment. For example, a real user may be provided with a limited recording ability as compared to avatars, who may have limited capabilities of capturing and sharing real-world information. Furthermore, the sensitive-information cues, associated with authorized cameras for capturing the target images, also enables in controlling recording ability of cameras. For example, the authorized cameras may be permitted to capture specific visual content, however, an unauthorized camera may be highlighted using the sensitive-information cues and prevented from capturing visual content. Moreover, the sensitive-information cues, i.e., users sharing same virtual space, may enable the users to become more vigilant while using the same virtual space. For example, such sensitive-information cues provide a privacy check even when users are sharing same virtual space and authorized for capturing visual content. This ensures that users within the same virtual environment have control over how their information is captured and shared. Furthermore, the sensitive-information cues related to prohibited viewpoints would enable in identifying and restricting cameras from capturing visual content from these prohibited angles. This helps in preventing unauthorized access to information through specific vantage points associated with the users of the extended reality environment. Similarly, the sensitive-information cues related to the prohibited distances for capturing the target images enables acts as another privacy check. For example, when camera gets too close to someone or an object deemed sensitive, such sensitive-information may enable in preventing unwanted intrusion and ensures users maintain a comfortable level of privacy within the virtual space. A technical effect is that a wide range of different sensitive-information cues are used for identifying the presence of the at least one visual-attribute in the live-displayable content.

The present disclosure also relates to the head mounted display as described above. Various embodiments and variants disclosed above, with respect to the aforementioned method, apply mutatis mutandis to the head mounted display.

The term "head-mounted display" device refers to specialized equipment that is configured to present the extended reality environment to the user when said head-mounted display (HMD), in operation, is worn by a user on his/her head. The HMD is implemented, for example, as an extended-reality headset, a pair of extended-reality glasses, and the like, that is operable to display a visual scene of the extended-reality environment to the user. Throughout the present disclosure, the term "camera" refers to an equipment that is operable to detect and process light signals received from a real-world environment, so as to capture the target images of the real-world environment. Examples of the camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

The term "processor" as used herein refers to a central processing unit of the HMD. The processor is responsible for executing instructions, performing computations and managing data. Typically, in the context of the 3D reconstruction, the processor defines the visual-attributes, identifies the presence of the visual-attributes in the target images and modifies the displayable content based on these attributes. Notably, the processor controls an overall operation of the imaging system. The processor is operatively coupled to the camera. The processor may be understood to be a compositor (namely, a processing unit configured to perform at least compositing tasks pertaining to generation of the target images). The compositor is a software module taking various inputs (such as the reference images and the target images) and composing (namely, modifying) the target images (that is to be subsequently displayed via the display screen).

The term "memory" as used herein refers to a storage component that retains data of the displayable content. Typically, the memory can be used to store the reference images, the visual-attributes and other relevant information needed for the 3D reconstruction process. The memory allows quick access to the stored-displayable content during real-time processing.

The term "display screen" as used herein refers to a screen in the head-mounted display (HMD) that visually presents displayable content to the user. It is typically a small, high-resolution screen or a pair of screens positioned close to the user's eyes. The display screen plays a crucial role in providing an immersive visual experience of the extended reality (XR) environment by showing modified displayable content based on the 3-D reconstruction. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display.

Optionally, the set of visual-attributes comprises at least one of:
  one or more areas in a displayable content of the reference images,
  one or more objects in the displayable content of the reference images,
  one of more colours in the displayable content of the reference images;
  one of more textures in the displayable content of the reference images.

Optionally, to define the set of visual-attributes, the processor is further operable to
  define the set of visual-attributes as conceal-attributes associated with an undesirable visual content, and
  define the set of visual-attributes as display-attributes associated with a desirable visual content.

Optionally, the processor is operable to conceal the identified at least one visual-attribute by one of:

alpha-blending the undesirable visual content associated with the at least one visual-attribute, blurring the undesirable visual content associated with the at least one visual-attribute, masking the undesirable visual content associated with the at least one visual-attribute, or overlaying the undesirable visual content, with artificially generated content, associated with the at least one visual-attribute.

DETAILED DESCRIPTION OF THE DRAWINGS

Referring to FIG. 1, illustrated is a flowchart of a method 100 of image processing for three-dimensional reconstruction in an extended reality environment, in accordance with an embodiment of the present disclosure. At step 102, a set of visual-attributes derived from reference images, are defined. At step 104, presence of at least one visual-attribute is identified in a displayable content of target images to be used for the three-dimensional reconstruction. At step 106, the displayable content of the target images is modified by concealing or displaying the identified at least one visual-attribute, for the three-dimensional reconstruction in the extended reality environment.

The aforementioned steps are only illustrative and other alternatives can also be provided where one or more steps are added, one or more steps are removed, or one or more steps are provided in a different sequence without departing from the scope of the claims herein.

Figure 2:
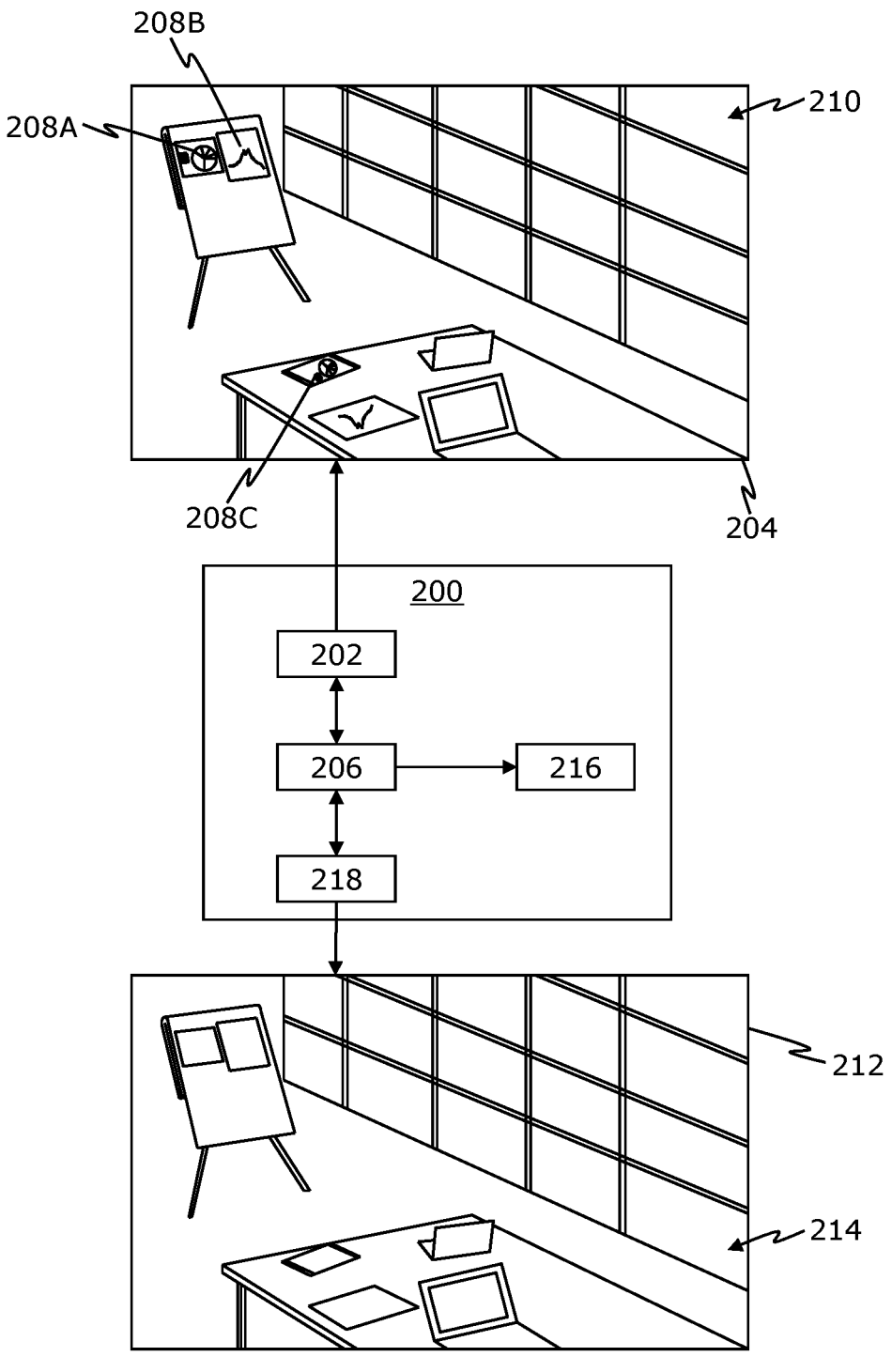
FIG. 2 is a schematic illustration of a head mounted display, in accordance with an embodiment of the present disclosure.

Referring to FIG. 2, illustrated is a schematic illustration of a head mounted display 200, in accordance with an embodiment of the present disclosure. As shown, the head mounted display 200 comprises, a camera 202 for capturing target images (depicted as a target image 204), a processor 206 operatively coupled to the camera 202. The processor 206 is operable to define a set of visual-attributes from reference images. Moreover, the processor 206 is operable to identify presence of at least one visual-attribute (depicted as first at least one visual-attribute 208A, a second visual-attribute 208B and a third visual-attribute 208C) in a displayable content 210 of the target images 204 to be used for a three-dimensional reconstruction 212. Furthermore, the processor 206 is operable to modify the displayable content 210 of the target images, by concealing or displaying the identified at least one visual-attribute 208A-C, for the three-dimensional reconstruction 212 in an extended reality environment 214. Moreover, the head mounted display 200 comprises a memory 216, operatively coupled to the processor 206 for storing the displayable content 210 and a display screen 218, operatively coupled to the processor 206 for viewing the displayable content 210.

Figure 3:
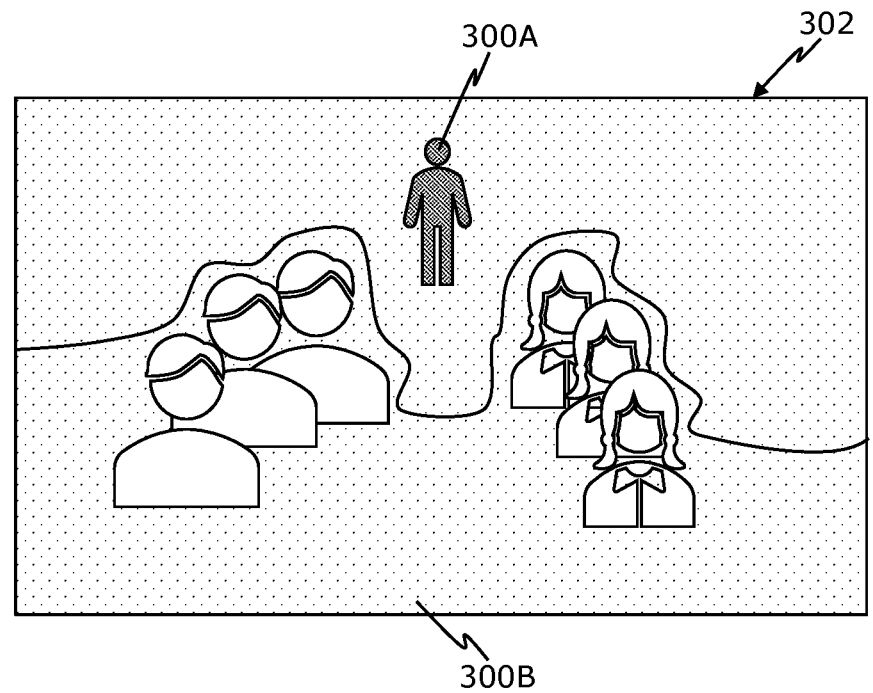
FIG. 3 is a schematic illustration of a defining a set of visual-attributes, in accordance with an embodiment of the present disclosure.

Referring to FIG. 3, illustrated is a schematic illustration of defining a set of visual-attributes (depicted as a first visual-attribute 300A and a second visual-attribute 300B), in accordance with an embodiment of the present disclosure. As shown, the set of visual attributes 300A-B are derived from reference images (depicted as a reference image 302). Moreover, the first visual attribute 300A from amongst the set of visual-attributes 300A-B is defined as conceal-attributes are associated with an undesirable visual content and the second visual attribute 300B from amongst the set of visual-attributes 300A-B is defined as display-attributes associated with a desirable visual content.

Figure 4A:
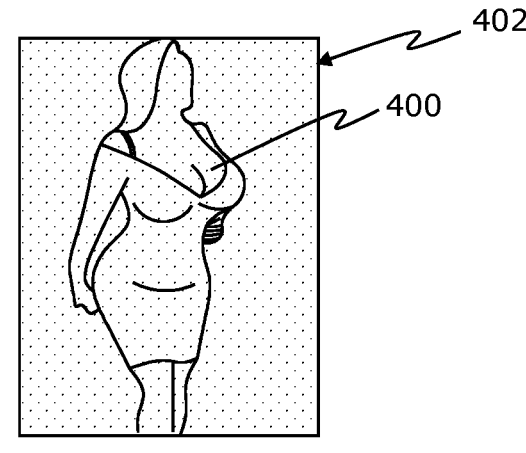
FIGS. 4A-D is a schematic illustration of concealing identified at least one visual-attribute, in accordance with an embodiment of the present disclosure.
Figure 4B:
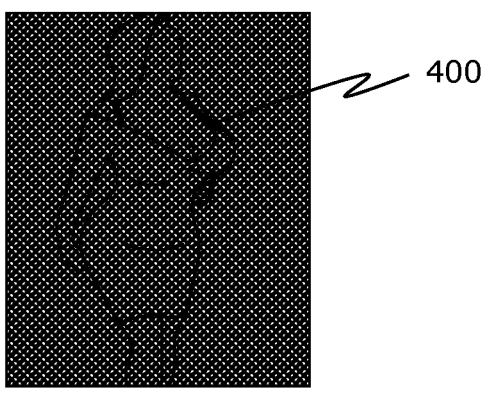
Figure 4C:
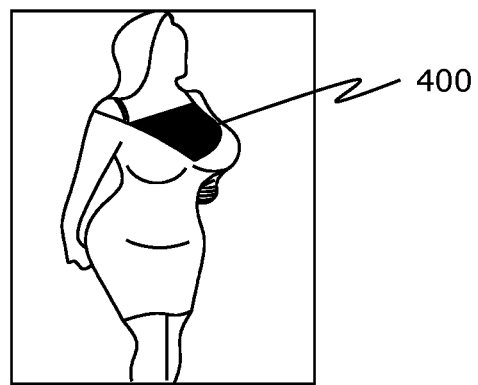
Figure 4D:
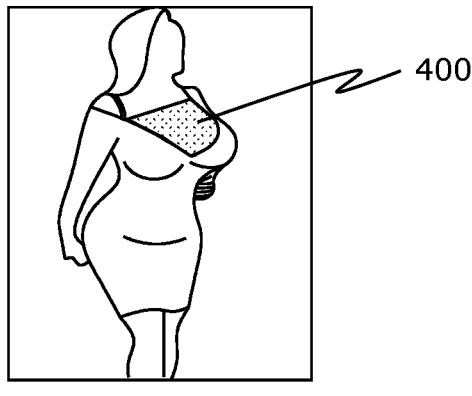

Referring to FIGS. 4A-D, illustrated is a schematic illustration of concealing identified at least one visual-attribute (depicted as a visual-attribute 400) in a target image 402, in accordance with an embodiment of the present disclosure. As shown in FIG. 4A, the identified at least one visual-attribute 400 is concealed by alpha-blending an undesirable visual content associated with the at least one visual-attribute 400. As shown in FIG. 4B, the identified at least one visual-attribute 400 is concealed by blurring the undesirable visual content associated with the at least one visual-attribute 400. As shown in FIG. 4C, the identified at least one visual-attribute 400 is concealed by masking the undesirable visual content associated with the at least one visual-attribute 400. As shown in FIG. 4D, the identified at least one visual-attribute 400 is concealed by overlaying the undesirable visual content associated with the at least one visual-attribute 400.

Figure 5:
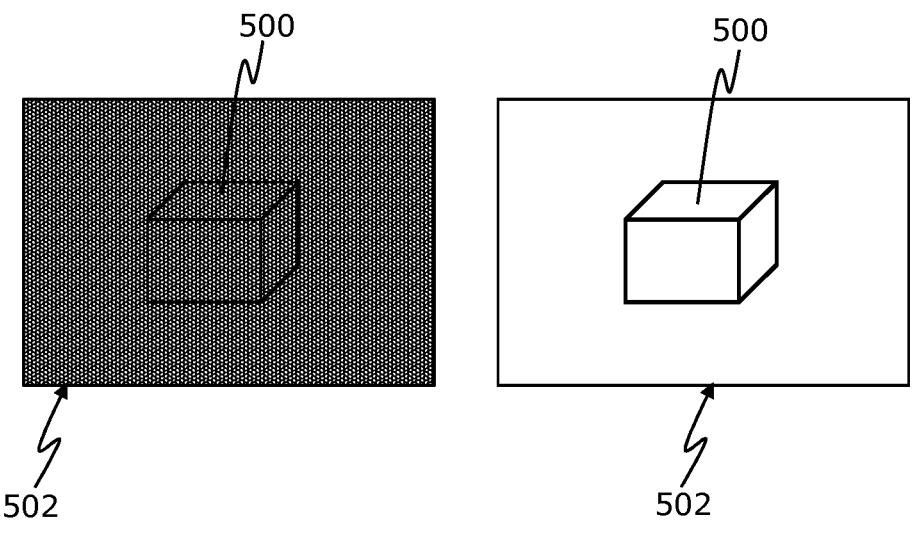
FIG. 5 is a schematic illustration of displaying an identified at least one visual-attribute, in accordance with an embodiment of the present disclosure.

Referring to FIG. 5, illustrated is a schematic illustration of displaying an identified at least one visual-attribute (depicted as a visual-attribute 500) in a target image 502, in accordance with an embodiment of the present disclosure. As shown, the identified at least one visual-attribute 500 is displayed by contrast enhancement of an desirable visual content associated with the at least one display-attribute 500.

Figure 6:
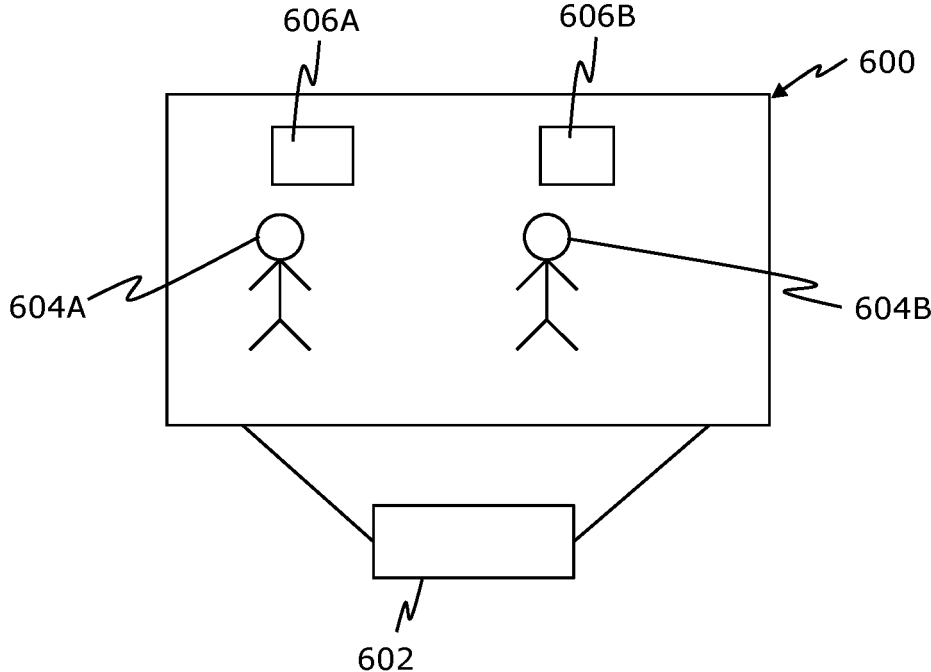
FIG. 6 is a schematic illustration of live-displayable content within an extended reality environment displayed on a head mounted display, in accordance with an embodiment of the present disclosure.

Referring to FIG. 6, illustrated is a schematic illustration of live-displayable content within an extended reality environment 600 displayed on a head mounted display 602, in accordance with an embodiment of the present disclosure. As shown, the extended reality environment 600 comprises users (depicted as a first user 604A and a second user 604B). Moreover, the first user 604A and the second user 604B are sharing a same virtual space. If the first user 604A is capturing the live-displayable content of the second user 604B, then sensitive-information cues 606A-B are rendered over the live-displayable content, associated within the extended reality environment 600, wherein the sensitive-information cues 606A-B enable to identify presence of at least one visual-attribute in the live-displayable content.

The invention claimed is:

1. A method of image processing for three-dimensional reconstruction in an extended reality environment, the method comprising:

defining a set of visual-attributes derived from reference images, wherein the set of visual-attributes comprises at least one of:

one or more areas in a displayable content of the reference images, one or more objects in the displayable content of the reference images, one or more colours in the displayable content of the reference images, one or more textures in the displayable content of the reference images;

identifying a presence of at least one visual-attribute in a displayable content of target images to be used for the three-dimensional reconstruction; and modifying the displayable content of the target images, by concealing or displaying the identified at least one visual-attribute, for the three-dimensional reconstruction in the extended reality environment, wherein modifying the displayable content further comprises:

concealing the identified at least one visual-attribute, when the identified at least one visual-attribute relates to conceal-attributes and a number of the conceal-attributes are less than display-attributes in the displayable content of the images, and displaying the identified at least one visual-attribute, when the identified at least one visual-attribute relates to the display-attributes and a number of the display-attributes are less than the conceal-attributes in the displayable content of the images.

2. The method according to claim 1, wherein defining the set of visual-attributes comprises at least one of:

defining the set of visual-attributes as conceal-attributes associated with an undesirable visual content, and defining the set of visual-attributes as display-attributes associated with a desirable visual content.

3. The method according to claim 2, wherein the undesirable visual content is associated with one of a private information, a secret information or an immoral information, and the desirable visual content is associated with one of a public information, a known information or a moral information.

4. The method according to claim 3, wherein the set of visual-attributes are associated with at least one of:

static or moving object, reflection of the static or moving object.

5. The method according to claim 1, further comprises controlling a level of concealing the conceal-attributes while modifying the displayable content based on a class of user associated with viewing of the modified displayable content in the extended reality environment, wherein the class of users comprises a first class of users authorized to view the displayable content with the conceal-attributes fully concealed and a second class of users authorized to view the displayable content with the conceal-attributes partially concealed.

6. The method according to claim 1, wherein concealing the identified at least one visual-attribute comprises one of alpha-blending the undesirable visual content associated with the at least one visual-attribute, blurring the undesirable visual content associated with the at least one visual-attribute, masking the undesirable visual content associated with the at least one visual-attribute, or overlaying the undesirable visual content, with artificially generated content, associated with the at least one visual-attribute.

7. The method according to claim 1, wherein displaying the identified at least one visual-attribute comprises one of sharpening, edge enhancement or contrast enhancement of the desirable visual content associated with the at least one display-attribute.

8. The method according to claim 1, wherein the displayable content of the images is associated with one of:

a live-displayable content of the target images to be processed for the three-dimensional reconstruction, or a recorded-displayable content of the target images processed to form the three-dimensional reconstruction.

9. The method according to claim 8, identifying presence of the at least one visual-attribute, when the displayable content is the live-displayable content comprising:

capturing the live-displayable content of the target images, and rendering sensitive-information cues, over the live-displayable content, associated within the extended reality environment, wherein the sensitive-information cues enable in identifying the presence of the at least one visual-attribute in the live-displayable content.

10. The method according to claim 9, wherein the sensitive-information cues comprise activation status of cameras in the extended reality environment, activation camera being real or virtual, users being real person or avatar, authorized cameras for capturing the target images, users sharing same a virtual space, prohibited viewpoints for capturing the target images, and prohibited distances for capturing the target images.

11. A head mounted display comprising:

a camera for capturing target images, a processor operatively coupled to the camera, the processor being configured to:

define a set of visual-attributes derived from reference images, wherein the set of visual-attributes comprises at least one of:

one or more areas in a displayable content of the reference images, one or more objects in the displayable content of the reference images, one or more colours in the displayable content of the reference images, one or more textures in the displayable content of the reference images;

identify a presence of at least one visual-attribute in a displayable content of the target images to be used for a three-dimensional reconstruction; and modify the displayable content of the target images, by concealing or displaying the identified at least one visual-attribute, for the three-dimensional reconstruction in an extended reality environment;

a memory, operatively coupled to the processor, for storing the displayable content; and a display screen, operatively coupled to the processor, for viewing the displayable content, wherein modifying the displayable content comprises:

concealing the identified at least one visual-attribute, when the identified at least one visual-attribute relates to conceal-attributes and a number of the conceal-attributes are less than display-attributes in the displayable content of the target images, and displaying the identified at least one visual-attribute, when the identified at least one visual-attribute relates to the display-attributes and a number of the display-attributes are less than the conceal-attributes in the displayable content of the target images.

12. The head mounted display according to claim 11, wherein to define the set of visual-attributes, the processor is further configured to define the set of visual-attributes as the conceal-attributes associated with an undesirable visual content, and define the set of visual-attributes as the display-attributes associated with a desirable visual content.

13. The head mounted display according to claim 11, wherein the processor is configured to conceal the identified at least one visual-attribute by one of:

alpha-blending the undesirable visual content associated with the at least one visual-attribute, blurring the undesirable visual content associated with the at least one visual-attribute, masking the undesirable visual content associated with the at least one visual-attribute, or overlaying the undesirable visual content, with artificially generated content, associated with the at least one visual-attribute.

* * * * *